United States Patent
Kumashiro (12)

(10) Patent No.: US 6,360,190 B1
(45) Date of Patent: *Mar. 19, 2002

(54) SEMICONDUCTOR PROCESS DEVICE SIMULATION METHOD AND STORAGE MEDIUM STORING SIMULATION PROGRAM

(75) Inventor: Shigetaka Kumashiro, Tokyo (JP)

(73) Assignee: NEC Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/200,061

(22) Filed: Nov. 25, 1998

(30) Foreign Application Priority Data

Nov. 28, 1997 (JP) .............................. 9-343689

(51) Int. Cl.[7] .......................... G06F 7/60; G06F 17/10; G06F 17/50

(52) U.S. Cl. .............................. 703/2; 703/14; 716/4; 716/5; 716/20

(58) Field of Search .................... 703/2, 14; 716/20, 716/4–5

(56) References Cited

U.S. PATENT DOCUMENTS

| | | | |
|---|---|---|---|
| 5,148,379 A | * | 9/1992 | Konno et al. .................. 716/20 |
| 5,490,278 A | * | 2/1996 | Mochizuki ................... 708/446 |
| 5,557,710 A | * | 9/1996 | Amdursky et al. ......... 345/419 |
| 5,604,911 A | * | 2/1997 | Ushiro ........................... 703/2 |
| 5,684,723 A | * | 11/1997 | Nakadai ....................... 716/20 |
| 5,844,821 A | * | 12/1998 | Roychowdhury .............. 716/4 |
| 6,144,932 A | * | 11/2000 | Hachiya ....................... 703/14 |
| 6,182,270 B1 | * | 1/2001 | Feldmann et al. ............. 716/5 |

FOREIGN PATENT DOCUMENTS

| | | |
|---|---|---|
| JP | KOKAI 6-53155 | 2/1994 |
| JP | KOKAI 8-213334 | 8/1996 |

OTHER PUBLICATIONS

Traar et al.: "High performance preconditioning on supercomputers for the 3D device simulator MINIMOS"; IEEE Proc. Supercomputer '90; pp. 224–231, Nov. 1990.*

Zhao et al.: "A new preconditioner for CGS iteration in solving large sparse nonsymmetric linear equations in semiconductor device simulation"; IEEE Trans. Comp. Aided Design of IC and Systems; pp. 1432–1440, Nov. 1991.*

Dag et al.; "Toward improved uses of the conjugate gradient method for power system applications"; IEEE Trans. Power Systems; pp. 1306–1314; Aug. 1997.*

(List continued on next page.)

Primary Examiner—Kevin J. Teska
Assistant Examiner—Hugh Jones
(74) Attorney, Agent, or Firm—Hayes, Soloway, Hennessey, Grossman & Hage, P.C.

(57) ABSTRACT

In this semiconductor process device simulation method, a coefficient matrix constituted by a principal diagonal submatrix arranged at any one of principal diagonals corresponding to each mesh point and representing a self feedback function at the mesh point, the principal diagonal submatrix having rows and columns in numbers corresponding to the number of mesh points, and a non-principal diagonal submatrix arranged on any one of a row and column passing through principal diagonal positions corresponding to the mesh point and representing an interaction between the mesh point corresponding to the principal diagonal positions and an adjacent mesh point connected to the mesh point through a mesh branch is generated. Calculation for the submatrices is performed while regarding each submatrix of the coefficient matrix as one element, thereby performing incomplete LU factorization of the coefficient matrix.

2 Claims, 7 Drawing Sheets

OTHER PUBLICATIONS

Eickhoff et al.; "Levelized incomplete LU factorization and its application to large–scale circuit simulation"; IEEE Trans. Computer–aided Design of Integrated Circuits and Systems; pp. 720–727; Jun. 1995.*

Fischer et al.; "Optimum scaling of non–symmetric Jacobian matrices for threshold pivoting preconditioners"; NUPAD V. Int. Workshop on Numerical Modeling of Processes and Devices for Integrated Circuits; pp. 123–126; Jun. 1994.*

Burch et al.; "A new matrix solution technique for general circuit simulation"; IEEE Trans. Computer–aided Design of Integrated Circuits and Systems; pp. 225–241; Feb. 1993.*

Pakzad et al.; "Independent columns: a new parallel ILU preconditioner for the PCG method"; Parallel Computing; vol. 23; pp. 637–647; Jun. 1997.*

Chronopoulos et al.; Parallel solution of a traffic flow simulation problem; Parallel Computing; vol. 22; pp. 1965–1983; Mar. 1997.*

"Process Device Simulation Technology", by Ryo Dan, Apr. 20, 1990,pp. 105–134.

"A New High–Speed Non–equilibrium Point Defect Model for Annealing Simulation" by M.Kawakami Et Al.

"Rapid Convergence Method for Bipolar–MOS Composit Device Simulator TONADDE II" by S.Nakamura et al.

* cited by examiner

SEMICONDUCTOR PROCESS DEVICE SIMULATION METHOD AND STORAGE MEDIUM STORING SIMULATION PROGRAM

BACKGROUND OF THE INVENTION

The present invention relates to a semiconductor process device simulation method of simulating the manufacturing process and electrical characteristics of a semiconductor device using a computer, and a storage medium storing a simulation program and, more particularly, to a simulation method of efficiently and numerically solving, on a computer, simultaneous multi-dimensional linear equations based on physical laws used for a simulation.

As semiconductor integrated circuits such as a VLSI have become smaller, manufacturing has become increasingly complicated. As a result low-temperature processing, precise annealing processing, and accurate process design are of increasing importance.

On such a background, in recent years, device simulations are generally used for development and research of, e.g., the manufacture of semiconductor devices. A factor for this is a great progress in computers which actually execute the device simulation. Additionally, more convenient interfaces for the computers are becoming available. The progress in the analysis technique allows simulations for objects in a wider range and even analysis of breakdown phenomena or current concentration in a semiconductor device.

In computer simulations of thermal impurity diffusion which is one of the manufacturing processes of a semiconductor device described in reference 1: Ryo Dan, "Process Device Simulation Technology", pp. 26–28, first a region to be analyzed is divided into meshes, and a diffusion equation is discretely defined for each mesh point. The diffusion equations are converted into linear equations and then into simultaneous linear equations by Newton's method or the like so as to solve the diffusion equations.

The electrical characteristics of a semiconductor device prepared by manufacturing processes including thermal impurity diffusion, ion implantation, and thermal oxidation can be simulated by the method described in reference 2 (Dan Ryo, "Process Device Simulation Technology", pp. 105–134), according to which a region to be analyzed is divided into meshes, and a Poisson equation and current continuous equation are discretely defined for each mesh point. These equations are converted into linear equations and then into simultaneous linear equations by Newton's method or the like, and the equations are solved on a computer, thereby simulating the electrical characteristics of the semiconductor device.

In these semiconductor process device simulation methods, it is important in practice to solve large scale simultaneous linear equations having as many dimensions as the number of mesh points using a computer with as small a memory and as high a speed as possible.

The function of solving these simultaneous linear equations is called a "matrix solver" for which various methods have been proposed. For example, for an equation having four dimensions factorization may be used.

And, for an equation having a large number of dimensions, an iterative method is used because of limitations on the memory capacity and calculation time needed. When the coefficient matrix of simultaneous linear equations to be solved is symmetrical, the ICCG (Incomplete Choleske and Conjugate Gradient) method is used. This is a CG (Conjugate-Gradient) method with preprocessing.

When the coefficient matrix is asymmetrical, a series of techniques called the Krylov subspace method are generally used because of advantages in convergence.

With both the ICCG and Krylov subspace methods, forming an algorithm for multiplying the original coefficient matrix with an approximate inverse matrix of the coefficient matrix of the equation to be solved permits a reduction in the number of conditions of the coefficient matrix, whereby the approximate inverse matrix of the coefficient matrix of the equation may be solved by a reduced number of iterations. This operation is called "preconditioning", as described above. The approximate inverse matrix of the coefficient matrix is called a "preconditioning matrix".

As the inverse matrix of the preconditioning matrix, a matrix obtained by "incomplete LU-factorization", i.e., LU-factorization, with limited fill-in generation positions is often used. Fill-in is a process of LU-factorization represented by equations (1) and (2) below and means that at a position (i, j) where an element value $A_{ij}$ is 0 in the original coefficient matrix, a new element $L_{ij}$ or $U_{ij}$ other than 0 is generated. When the generated fill-in is not rejected, and taken into consideration in the subsequent process of $$L_{ij} = A_{ij} - \sum_{k=1}^{j-1} L_{ik} U_{kj} \quad (k < j < i) \tag{1}$$

$$U_{ij} = L_{ii}^{-1}\left(A_{ij} - \sum_{k=1}^{i-1} L_{ik} U_{kj}\right) \quad (k < i < j) \tag{2}$$

LU-factorization, conventional complete LU-factorization is performed.

In preprocessing based on incomplete LU-factorization, it is required to perform optimum processing which satisfies the following two contradictory conditions. First, fill-in generation should be minimized to suppress the amount of memory used and calculation time needed for performing the calculation. Second, a result as close as possible to complete LU-factorization should be obtained to increase convergence of the iterative method.

A conventional method of efficiently performing such processing is described in reference 3 (Shin Nakamura and Akio Nakagawa, High-speed Iterative Method for Two-dimensional Bipolar MOS Composite Device Simulator TONADDEII", IEICE Technical Report, pp. 64–65) or reference 4 (Megumi Kawakami, Masahiro Sugaya, and Shiroo Kamohara, "A New High-speed Non-equilibrium Point Defect Model for Annealing Simulation", SISPAD '96, p. 94, FIG. 1a) is used.

In the method described in reference 3 or 4, as shown in the flow chart of FIG. 8, first, the maximum value n of the number of equations to be solved which are defined for each point is obtained in step 801. In step 802, the rows and columns of the coefficient matrix are put into a group in units of square submatrices of n×n for each mesh point, thereby forming blocks of coefficient matrices. In step 803, while virtually regarding an n×n square submatrix as one matrix, incomplete LU-factorization processing based on calculation of the square submatrices is performed. FIG. 9 shows the structure of the coefficient matrix formed by the above operation.

With the operation in units of square submatrices, incomplete LU-factorization close to complete LU-factorization can be more effectively performed using the same memory capacity as would be in processing units of scalar elements. This is because the fill-in generation pattern is determined while giving prominence to a combination of equations at one mesh point.

Objects to which the above-described conventional semiconductor process device simulation technology is applied are disclosed in Japanese Patent Laid-Open No. 6-53155 or 8-213334.

However, the above-described conventional semiconductor process device simulation technology has the following problem. That is, when a equation is derived from a certain physical law holds for only part of an analysis region to be processed, or no equation is defined, excess memory capacity is required to process incomplete LU-factorization.

This is because in making the computer calculations, a square submatrix having a uniform size of n×n is used as the processing unit of incomplete LU-factorization. For example, in the above-described simulation, the submatrix size of n×n is maintained even at a mesh point where n equations are not defined. The computer performing the calculations must form an overall coefficient matrix while inserting "1" to the corresponding principal diagonal portions of the submatrix and set the coefficient matrix on the memory. For this reason, excess memory capacity is used.

When the computer executes its calculation, excess memory is accessed. This wasteful processing adds to processing time.

SUMMARY OF THE INVENTION

It is the main object of the present invention to provide high speed simulation without using an excess memory for calculation.

It is another object of the present invention to provide a semiconductor process device simulation method which allows high-speed incomplete LU-factorization without using excess memory capacity even when an equation derived from a certain physical law and used to simulate the manufacturing process or electrical characteristics of a semiconductor device using a computer holds at only one portion of a region to be analyzed, or no equation is defined, and a storage medium storing a simulation program therefor.

In order to achieve the above objects, according to one aspect of the present invention there is provided a semiconductor device manufacturing process simulation method to aid manufacturers in forecasting electrical characteristics of semiconductor devices by performing a plurality of matrix manipulations of terms representing physical properties of the semiconductor devices, the matrices to be manipulated representing multidimensional simultaneous linear equations that are to be solved by a matrix solver that uses an iterative method in which the matrices are preconditioned by incomplete LU-factorization, the method for generating fill-ins for the matrices comprising the steps of: a first step of dividing the surface of a semiconductor device to be processed into a plurality of rectangles forming a mesh of predetermined size; a second step of assigning a numerical value to each mesh point of the mesh; a third step of setting equations representing a relationship among the plurality of numerical values; a fourth step of generating a coefficient matrix constituted by a plurality of principal diagonal submatrices each of which is arranged at each one of principal diagonal positions corresponding to each mesh point and representing a self feedback function to the mesh point, the coefficient matrix having rows and columns in numbers corresponding to the number of mesh points, and a plurality of non-principal diagonal submatrices each of which is arranged on any one of rows and columns passing through the principal diagonal positions corresponding to the mesh point and representing an interaction between the mesh point corresponding to the principal diagonal located on the same row or on the same column of the coefficient matrix with the non-principal diagonal submatrix and an adjacent mesh point connected to the mesh point through a mesh branch; a fifth step of performing calculation for the submatrices while regarding each submatrix of the coefficient matrix as one element, thereby performing incomplete LU-factorization of the coefficient matrix, wherein each of the principal diagonal submatrices is a square having rows and columns equal in number to equations set for a mesh point corresponding to the principal diagonal submatrix, each of the non-principal diagonal submatrices arranged in a row direction in correspondence with each of the mesh points is a matrix having rows equal in number to equations set at a mesh point corresponding to the principal diagonal submatrix located in the row and columns equal in number to equations set at an adjacent mesh point connected to the mesh point through a mesh branch, and each of the non-principal diagonal submatrices arranged in a column direction in correspondence with each of the mesh points is a matrix having columns equal in number to equations set at a mesh point corresponding to the principal diagonal submatrix located in the column and rows equal in number to the equations set at an adjacent mesh point connected to the mesh point through a mesh branch; and a sixth step of producing a signal indicative of the result of said calculation.

In another aspect of the invention there is provided a computer readable memory storing a semiconductor device manufacturing process simulation program to aid manufacturers in forecasting electrical characteristics of semiconductor devices by performing a plurality of matrix manipulations of terms representing physical properties of the semiconductor devices, the matrices to be manipulated representing multidimensional simultaneous linear equations that are to be solved by a matrix solver that uses an iterative method in which the matrices are preconditioned by incomplete LU-factorization, the program including a routine for generating fill-ins for the matrices, the routine comprising the steps of: causing a computer to perform the following functions: a first function of dividing a surface of a semiconductor device to be processed into a mesh of predetermined size; a second function of assigning a numerical value to each mesh point of the mesh; a third function of setting equations representing a relationship among the plurality of numerical values; a fourth function of generating a coefficient matrix constituted by a plurality of principal diagonal submatrices each of which is arranged at each one of principal diagonal positions corresponding to each mesh point and representing a self feedback function at the mesh point, the coefficient matrix having rows and columns in numbers corresponding to the number of mesh points, and a plurality of non-principal diagonal submatrices each of which is arranged on any one of rows and columns and representing an interaction between the mesh point corresponding to the principal diagonal positions located on the same row or on the same column of the coefficient matrix with the non-principle diagonal submatrix and an adjacent mesh point connected to the mesh point through a mesh branch; and a fifth function of performing calculation for the submatrices while regarding each submatrix of the coefficient matrix as one element; thereby performing incomplete LU-factorization of the coefficient matrix, wherein each of the principal diagonal submatrices is a square matrix having rows and columns equal in number to equations set forth for a mesh point corresponding to the principal diagonal submatrix, each of the non-principal diagonal submatrices arranged in a row direction in correspondence with each of the mesh points is a matrix having rows equal in number to equations set at a mesh point corresponding to the principal diagonal submatrix and located in the row and columns equal in number to equations set at an adjacent mesh point connected to the mesh point through a mesh branch, and each of the non-principal diagonal submatrices arranged in a column direction in correspondence with each of the mesh points is a matrix having columns equal in number to equations set a mesh point corresponding tot he principal diagonal submatrix located in the column and rows equal in number to equations set at an adjacent mesh point connected to the mesh point through a mesh branch.

With this arrangement, the non-principal diagonal submatrix not always will be a square matrix. When the number of equations set at an adjacent mesh point connected to a mesh point of interest through a mesh branch is smaller than that set for the mesh point of interest, a non-square matrix is obtained, so the number of calculations is reduced as compared to a case in which a square matrix is simply assigned.

DESCRIPTION OF THE PREFERRED EMBODIMENTS

The present invention will be described below with reference to the accompanying drawings.

Figure 1:
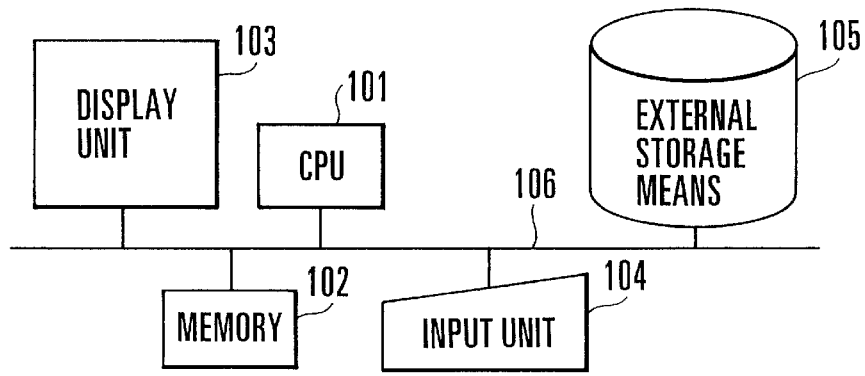
FIG. 1 is a block diagram showing the arrangement of a simulation apparatus for realizing a semiconductor process device simulation method according to the present invention.

FIG. 1 shows the arrangement of a simulation apparatus for realizing a semiconductor process device simulation method according to the present invention.

This simulation apparatus comprises a central processing unit (CPU) 100, a memory 102, a display unit 103, an input unit 104, and an external storage means 105 which are connected through a bus 106. More specifically, the simulation apparatus is realized by a workstation, a personal computer, or any other computer system. For example, as the external storage means 105, a magnetic disk, a semiconductor memory, or any other general storage medium can be used.

In this simulation apparatus, a program (simulation program) for simulation is stored in the external storage means 105. When the operator inputs an instruction for the start of simulation from the input unit 104, the CPU 101 loads the program from the external storage means 105 into a predetermined area in the memory 102. The operator prepares data necessary for simulation (matrix) in the memory 102 by, e.g., inputting the data from the input unit 104. The data necessary for simulation may be stored in the external storage means 105 in advance and loaded in the memory 102. The CPU 101 performs predetermined calculations using the data in accordance with the program loaded in the memory 102, thereby performing predetermined simulation. Finally, the CPU 101 displays the simulation result on the display unit 103.

Figure 2:
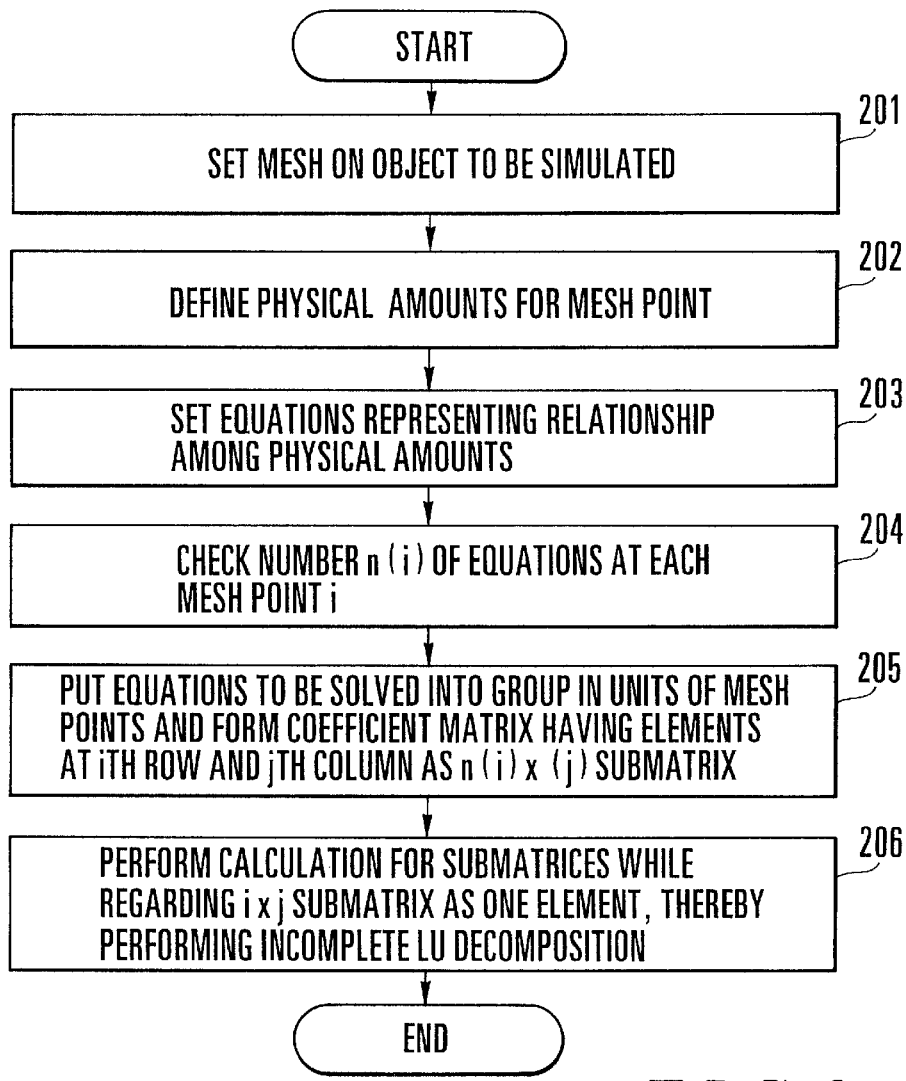
FIG. 2 is a flow chart showing the flow of basic operation of semiconductor process device simulation executed by the simulation apparatus (CPU 100) shown in FIG. 1.

FIG. 2 shows the flow of basic operation of semiconductor process device simulation executed by the simulation apparatus (CPU 101) shown in FIG. 1.

The operation will be briefly described. Beginning with steps 201 to 203 first, in step 201, a mesh having a predetermined pitch is set on the object to be simulated by, e.g., inputting data from the input unit 104 (FIG. 1), and stored in the memory 102. Assume that I mesh points are set. In step 202, a plurality of values are defined for each mesh point by, e.g., inputting them from the input unit 104 and stored in the memory 102. In step 203 equations representing the relationship between the plurality of values are formed and stored in the memory 102.

In step 204, the CPU 101 checks the number n(i) of equations to be solved, which represent the relationship between the plurality of values defined for each mesh point i (i is an integer, $1 \leq i \leq I$) and are stored in the memory 102, on the basis of the loaded program, and stores the value in the memory 102 shown in FIG. 1.

In step 205, the CPU 101 puts equations to be solved, which are stored in the memory 102, into groups in units of mesh points, and forms, in the memory 102, a coefficient matrix represented as blocks arranged at nonuniform pitches and having elements at the ith row and jth column as an n(i)×n(j) submatrix. More specifically, a coefficient matrix having rows and columns equal in number to mesh points is set. A principal diagonal submatrix representing the self feedback function at each mesh point is arranged at a portion (element) corresponding to the mesh point. In addition, at one of the row and column passing through the principal diagonal position corresponding to each of mesh points other than the principal diagonal of the coefficient matrix, a non-principal diagonal submatrix representing the interaction between a mesh point corresponding to the principal diagonal position and an adjacent mesh point connected to the mesh point through a mesh branch is arranged. The principal diagonal submatrix is a square matrix having rows and columns, the number of which is equal to the number n(i) of equations defined for the corresponding mesh point. A non-principal diagonal submatrix arranged in the row direction in correspondence with each mesh point is a matrix having rows the number of which is equal to the number n(i) of equations defined for the mesh point and columns the number of which is equal to the number n(j) of equations defined for an adjacent mesh point connected to the mesh point through a mesh branch. A non-principal diagonal submatrix arranged in the column direction in correspondence with each mesh point is a matrix having columns the number of which is equal to the number n(i) of equations defined for the mesh point and rows the number of which is equal to the number n(j) of equations defined for an adjacent mesh point connected to the mesh point through a mesh branch.

Finally, in step 206, the CPU 101 performs calculations for the submatrices while regarding the submatrix at the ith row and jth column, which is formed on the memory 102, as one element, thereby performing incomplete LU-factorization of the coefficient matrix.

Figure 3:
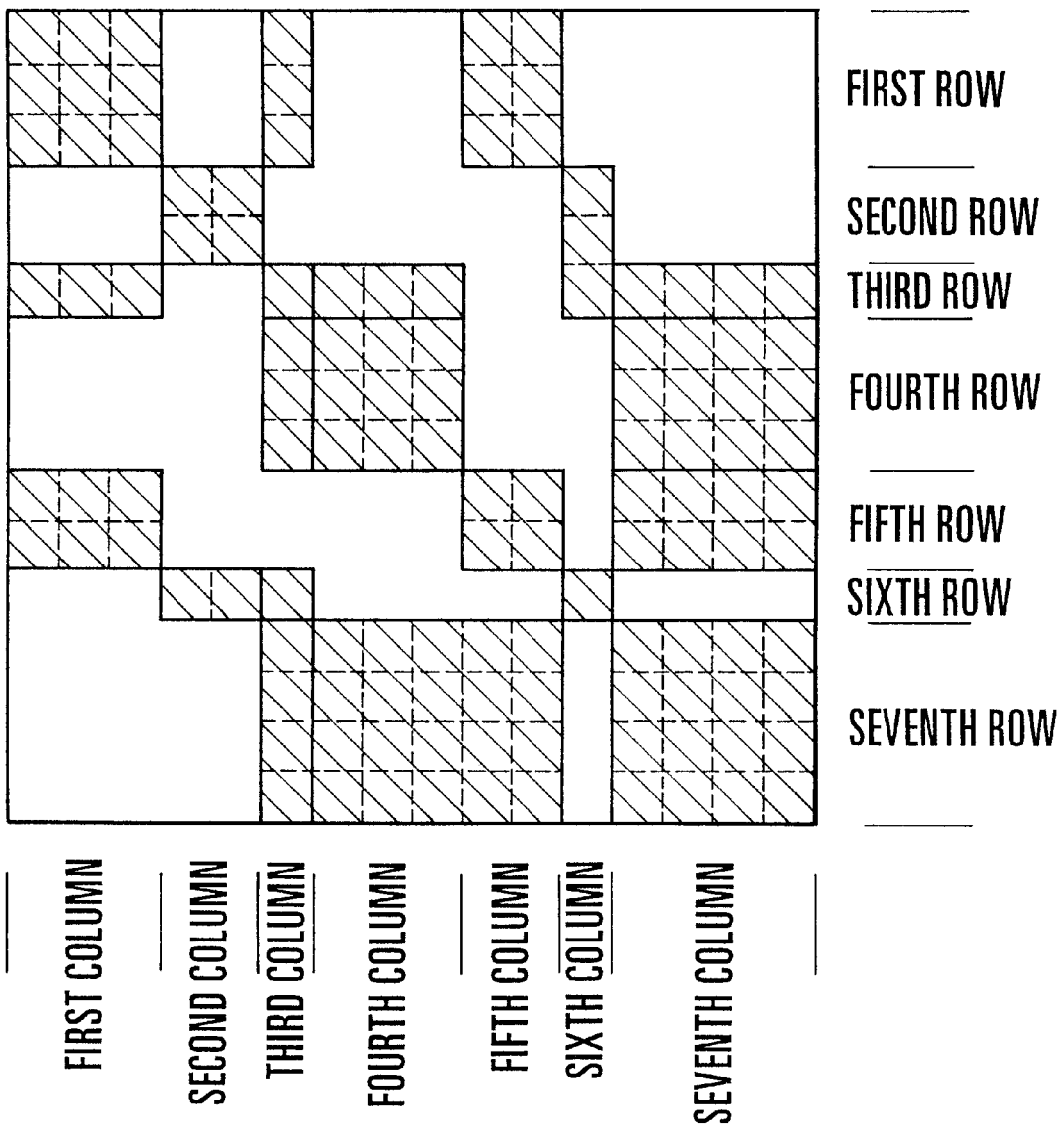
FIG. 3 is an explanatory view showing an example of the structure of a coefficient matrix formed in the simulation operation.

The simulation operation of the present invention after the equations representing the relationship between the values assigned for each mesh point are set will be described next with reference to the flow chart of FIG. 2 and the view of FIG. 3. FIG. 3 shows an example of the structure of the coefficient matrix formed in the simulation operation.

The number of equations at each mesh point on the surface of the object to be simulated, i.e., a semiconductor device on which a mesh is set, is checked (FIG. 2: step 204). In the following description, assume that a total of seven mesh points are present, and three equations are defined at mesh point 1, two equations are defined at mesh point 2, one equation is defined at mesh point 3, three equations are defined at mesh point 4, two equations are defined at mesh point 5, one equation is defined at mesh point 6, and four equations are defined at mesh point 7 so as to represent the states at the respective mesh points. That is, n(1)=3, n(2)=2, n(3)=1, n(4)=3, n(5)=2, n(6)=1, and n(7)=4.

The equations to be solved are put into groups in units of mesh points to form coefficient matrix blocks (FIG. 2: step 205). When the above-described mesh is set, coefficient matrices as shown in FIG. 3 are obtained. Referring to FIG. 3, a hatched portion enclosed by bold solid lines represents a block, and broken lines represent boundaries between scalar elements in each block. For example, the block at the seventh row and fourth column forms a 4×3 non-square matrix.

A submatrix is regarded as one element. The equations are solved by performing incomplete LU-factorization according to the above-described equations (1) and (2) by calculation of the square and non-square matrices, thereby simulating the state at each mesh point (step 206). For example, in FIG. 3, an element $L_{33}$ is generated by factorizing the third row and third column by subtracting the product of a 1×3 submatrix $L_{31}$ and a 3×1 submatrix $U_{13}$, which have been decomposed, from a 1×1 coefficient matrix element $A_{33}$, i.e., "$L_{33}=A_{33}-L_{31}U_{13}$... (3)."

FIRST EMBODIMENT

The present invention will be described using a more specific example. An example in which the diffusion state of an impurity doped into a silicon substrate having an oxide film is simulated will be described.

Figure 4:
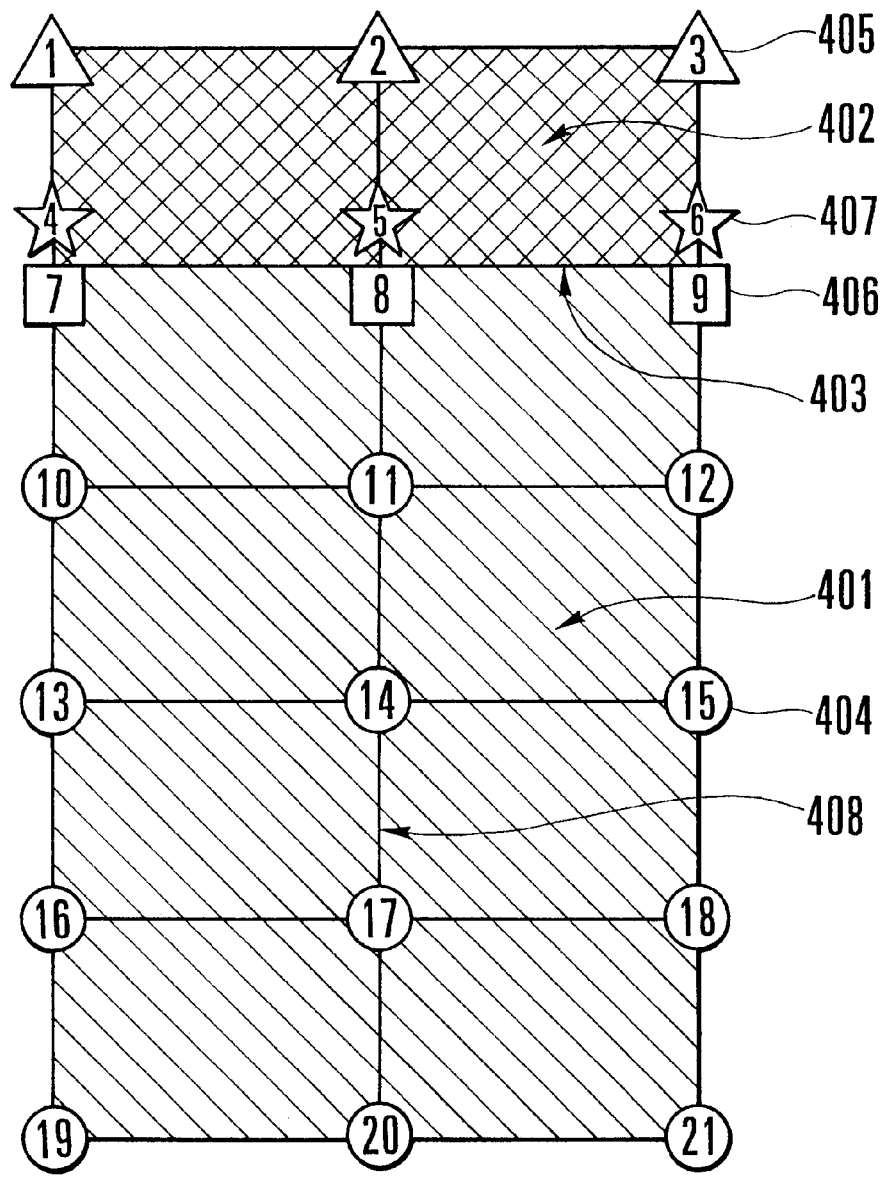
FIG. 4 is an explanatory view schematically showing the section of an object to be simulated in the first embodiment of the present invention.

In this impurity diffusion simulation, a mesh having a predetermined pitch is allocated to a section (two-dimensional region) of a silicon substrate having an oxide film, and predetermined equations are set for each mesh point. FIG. 4 shows the two-dimensional region. A region 401 divided into eight blocks is the region of the silicon substrate. A region 402 divided into two blocks on the region 401 indicates the oxide film formed on the silicon substrate. A line segment 403 represents the boundary between the silicon substrate and the oxide film.

Mesh points 404 having numbers "10" to "21" and marked with circles in the region 401 are mesh points assigned in the two-dimensional region of the silicon substrate. Mesh points 405 having numbers "1" to "3" and marked with triangles in the region 402 are mesh points assigned on the surface of the two-dimensional oxide film region. Mesh points 406 having numbers "7" to "9" and marked with rectangles are mesh points representing the silicon substrate side of the interface between the silicon substrate and the oxide film. Mesh points 407 having numbers "4" to "6" and marked with stars are mesh points representing the oxide film side of the interface between the silicon substrate and the oxide film. The mesh points are coupled through mesh branches 408.

In this impurity diffusion simulation, diffusion simulation of boron is performed using a diffusion model paired with a point defect. In the model for simulation, the following physical phenomenon is used on the silicon substrate. First, assume that interstitial silicon and silicon vacancies as point defects are present in the silicon substrate, and the interstitial silicon and silicon vacancies diffuse while being recombined with each other. Boron as an impurity diffuses while forming pairs with interstitial silicon. When the pairs are dissociated, the boron atoms are set at the substitution positions of the crystal lattice of the silicon substrate.

According to the above point defect-paired diffusion model, five equations (4) to (8) below are equations to be solved at each of the mesh points 404 from "10" to "21" in the silicon substrate.

$$\frac{\partial C_{BI}}{\partial t} = \nabla\left[D_{BI}\nabla C_{BI} + \frac{qD_{BI}}{kT}Z_{BI}C_{BI}\nabla\phi\right] + k_{BI-f}C_{Ba}C_I - k_{BI-r}C_{BI} \quad (4)$$

$$\frac{\partial C_{Ba}}{\partial t} = k_{BI-r}C_{BI} + k_{BI-f}C_{Ba}C_I \quad (5)$$

$$\frac{\partial C_I}{\partial t} = \nabla\left[D_I\nabla C_I + \frac{qD_I}{kT}Z_I C_I \nabla\phi\right] + k_{BI-r}C_{BI} - k_{BI-f}C_{Ba}C_I - k_{IV}(C_I C_V - C_I^* C_V^*) \quad (6)$$

$$\frac{\partial C_V}{\partial t} = \nabla\left[D_V\nabla C_V + \frac{qD_V}{kT}Z_V C_V \nabla\phi\right] - k_{IV}(C_I C_V - C_I^* C_V^*) \quad (7)$$

$$\nabla(\varepsilon\nabla\phi) = -q\left[Z_{BI}C_{BI} - C_{Ba} + Z_I C_I + Z_V C_V - n_i\exp\left(\frac{q\phi}{kT}\right) + n_i\exp\left(-\frac{q\phi}{kT}\right)\right] \quad (8)$$

Of the above equations, equation (4) represents diffusion, generation, and dissociation of boron-interstitial silicon pairs. Equation (5) represents bond and dissociation of boron. Equation (6) represents diffusion, bond, dissociation, and disappearance of interstitial silicon. Equation (7) represents diffusion and disappearance of silicon vacancies. Equation (8) is a Poisson equation representing the relationship among charged point defects, boron concentration, and electrostatic potential.

In equations (4) to (6), $C_{BI}$ is the volume concentration of boron-interstitial silicon pairs, $C_{Ba}$ is the volume concentration of active boron at the substitution positions, $C_I$ is the volume concentration of interstitial silicon, and $C_V$ is the volume concentration of silicon vacancies.

$Z_{BI}$ is the number representing the charged state of boron-interstitial silicon pairs, $Z_i$ is the number representing the charged state of interstitial silicon, and $Z_V$ is the number representing the charged state of silicon vacancies.

$D_{BI}$ is the diffusion constant of boron-interstitial silicon pairs, $D_I$ is the diffusion constant of interstitial silicon, and $D_V$ is the diffusion constant of silicon vacancies.

In addition, $k_{BI-f}$ is the formation constant of boron-interstitial silicon pairs, $k_{BI-r}$ is the dissociation reaction rate constant, and $k_{IV}$ is the recombination ratio of interstitial silicon and silicon vacancies.

Furthermore, q is the unit charge, $\in$ is the dielectric constant of silicon, k is the Boltzman constant, T is the absolute temperature, $\phi$ is the electrostatic potential, and $n_i$ is the intrinsic carrier density of silicon.

$C^*_I$ is the volume density of interstitial silicon in the thermal equilibrium state, and $C^*_V$ is the volume density of silicon vacancies in the thermal equilibrium state.

Diffusion of boron in the oxide film can be described using a normal model when boron itself directly diffuses without forming pairs. In addition, in the oxide film, the influence of the electrostatic potential can be disregarded.

Therefore, at the mesh points 405 in the oxide film, the concentration of boron as an impurity at these mesh points can be simulated by solving a normal diffusion equation such as equation (9) below:

$$\frac{\partial C_{Bc}}{\partial t} = \nabla [D_B \nabla C_{Bc}] \tag{9}$$

where $C_{Bc}$ is the total concentration of boron in the oxide film, and $D_B$ is the diffusion constant of boron in the oxide film.

At the interface between the silicon substrate and the oxide film, a flux Js due to segregation of boron, which is given by equation (10) below, is present between the mesh point 406 and the mesh point 407:

$$J_S = h\left(C_{Bc} - \frac{C_{BI}}{m}\right) \tag{10}$$

where $C_{Bc}$ is the total concentration of boron at the mesh point 407 on the oxide film side, $C_{BI}$ is the concentration of boron-interstitial silicon pairs at the mesh point 406 on the silicon side, h is the transportation coefficient of boron at the interface between the silicon substrate and the oxide film, and m is the segregation coefficient of boron at the interface between the silicon substrate and the oxide film.

The interstitial silicon and silicon vacancies in the silicon substrate disappear at the interface between the silicon substrate and the oxide film. In consideration of this, equations to be solved at the mesh point 406 on the silicon substrate side in diffusion simulation of boron as an impurity are five equations (11) to (15) below:

$$\frac{\partial C_{BI}}{\partial t} = \nabla \left[D_{BI} \nabla C_{BI} + \frac{qD_{BI}}{kT} Z_{BI} C_{BI} \nabla \phi\right] + \\ k_{BI-f} C_{Ba} C_I - k_{BI-r} C_{BI} + h\left(C_{Bc} - \frac{C_{BI}}{m}\right) \tag{11}$$

$$\frac{\partial C_{Ba}}{\partial t} = k_{BI-r} C_{BI} + k_{BI-f} C_{Ba} C_I \tag{12}$$

$$\frac{\partial C_I}{\partial t} = \nabla \left[D_I \nabla C_I + \frac{qD_I}{kT} Z_I C_I \nabla \phi\right] + \\ k_{BI-r} C_{BI} - k_{BI-f} C_{Ba} C_I - k_{IV}(C_I C_V - C_I^* C_V^*) - \\ k_{IS}(C_I - C_I^*) \tag{13}$$

$$\frac{\partial C_V}{\partial t} = \nabla \left[D_V \nabla C_V + \frac{qD_V}{kT} Z_V C_V \nabla \phi\right] - \\ k_{IV}(C_I C_V - C_I^* C_V^*) - k_{VS}(C_I - C_I^*) \tag{14}$$

$$\nabla(\varepsilon \nabla \phi) = -q\Big[Z_{BI} C_{BI} - C_{Ba} + Z_I C_I + Z_V C_V - \\ n_i \exp\left(\frac{q\phi}{kT}\right) + n_i \exp\left(-\frac{q\phi}{kT}\right)\Big] \tag{15}$$

where $k_{IS}$ of equation (13) is the recombination rate of the interstitial silicon at the interface between the silicon substrate and the oxide film, and $k_{VS}$ in equation (14) is the recombination rate of silicon vacancies at the interface between the silicon substrate and the oxide film.

In addition, an equation to be solved at the mesh point 407 on the oxide film side is equation (16) below:

$$\frac{\partial C_{Bc}}{\partial t} = \nabla [D_B \nabla C_{Bc}] - h\left(C_{Bc} - \frac{C_{BI}}{m}\right) \tag{16}$$

Figure 5:
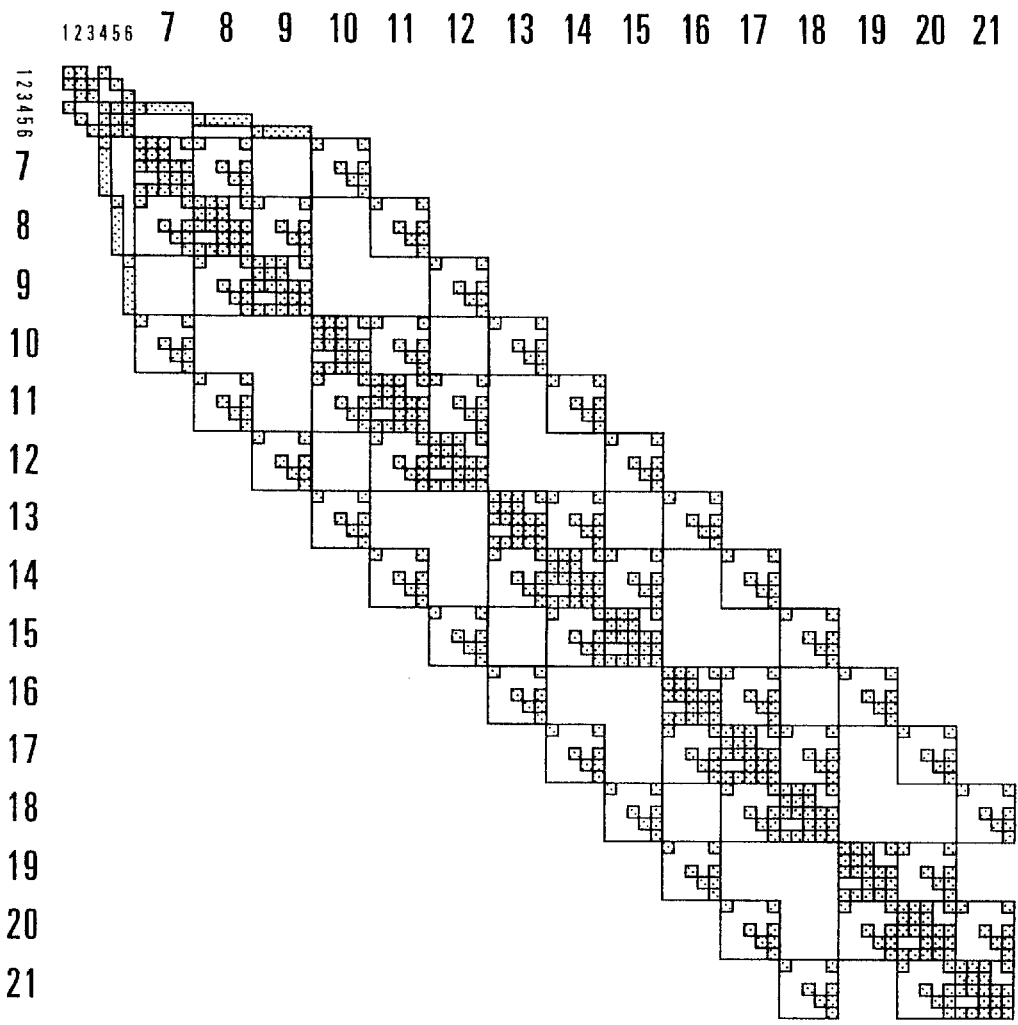
FIG. 5 is an explanatory view showing a coefficient matrix used to simulate the object to be simulated, shown in FIG. 4.

The simulation operation of the first embodiment will be described with reference to the flow shown in FIG. 2. First, the number of equations defined at each mesh point is checked (step 204). In the first embodiment, at a mesh point such as the mesh point 404 or 406 on the silicon substrate side in FIG. 4, five equations such as equations (4) to (8) or (11) to (15) are defined. At a mesh point such as the mesh point 405 or 407 on the oxide film side, one equation such as equation (9) or (16) is defined. Subsequently, the equations to be solved are put into a group in units of mesh points to form a coefficient matrix represented by blocks shown in FIG. 5 (step 205). In FIG. 5, a coefficient matrix having 21 rows and 21 columns which correspond to numbers "1" to "21" assigned to the mesh points in FIG. 4 is obtained. In one row of the coefficient matrix shown in FIG. 5, all of the square submatrix blocks at the mesh points constituting the principal diagonals having the row numbers as the mesh point numbers shown in FIG. 4 and the square or non-square submatrix blocks at adjacent mesh points connected to the mesh point through the mesh branches 408 are arranged.

In the first embodiment, for a mesh point such as the mesh point 404 or 406 on the silicon side, the width of each block is 5, as indicated by row "7" and column "7" to row "21" and column "21". To the contrary, for a mesh point such as the mesh point 405 or 407 to which numbers "1" to "6" are assigned on the oxide film side, the width of each block is 1, as indicated by row 1.111 and column "1" to row "6" and column "6". In each block shown in FIG. 5, a blank portion represents that a numerical value to be calculated is not stored.

For example, for row "8" in FIG. 5, which corresponds to the mesh point 406 represented by "8" in FIG. 4, a 5×5 submatrix principal diagonal block of the mesh point 406 with "8" is present at row "8" and column "8". This principal diagonal block has 20 numerical values to be calculated. As shown in FIG. 4, the mesh point 404 represented by "11" is present under the mesh point 406 represented by "8", so a 5×5 submatrix block corresponding to the mesh point 404 represented by "11" and marked with a circle is present at row "8" and column "11" in FIG. 5. This submatrix block has seven numerical values to be calculated. As shown in FIG. 4, the mesh point 406 represented by "7" and the mesh point 406 represented by "9" are present on the left and right side of the mesh point 406 represented by "8", respectively, so 5×5 submatrix blocks corresponding to these mesh points are present at row "8" and column "7" and row "8" and column "9". Each of these submatrix blocks also has seven numerical values to be calculated. As shown in FIG. 4, the mesh point 407 represented by "5" is present above the mesh point 406 represented by "8", so a 5×1 non-square submatrix block corresponding to the mesh point 407 is present at row "8" and column "5", as shown in FIG. 5.

Similarly, for row "5" corresponding to the mesh point 407 represented by "5" in FIG. 4, a 1×1 submatrix principal diagonal block corresponding to the mesh point 407 is present at row "5" and column "5". In correspondence with the mesh point 405 represented by "2" above the mesh point 407 represented by "5", a 1×1 submatrix block corresponding to the mesh point 405 is present at row "5" and column "2" in FIG. 5. Since the mesh points 407 represented by "4" and "6" are present on the left and right sides of the mesh point 407 represented by "5 ", 1×1submatrix blocks corresponding to the mesh points 407 are present at row "5" and column "14" in FIG. 5 and row "5" and column "6" in FIG. 5. In addition, since the mesh point 406 represented by "8" is present under the mesh point 407 represented by "5", a 1×5 non-square submatrix block is present at row "5" and column "8" in FIG. 5.

Finally, each submatrix is regarded as one element, and calculation for square matrices and calculation for non-square matrices are performed to perform incomplete LU-factorization in accordance with equations (1) and (2), thereby solving the equations and simulating the states at the above-described mesh points (step 206).

As described above, in the first embodiment, calculation is performed using matrices whose calculation amount is smaller than that for a 5×5 submatrices. For this reason, wasteful calculation can be omitted, and the calculation time can be shortened. The principal diagonal block at each mesh point on the oxide film side is a 1×1 square matrix. A non-diagonal matrix at each mesh point at the interface is a 1×5 or 5×1 non-square matrix. Conventionally, since a 5×5 submatrix is formed even for these mesh points, an excess memory capacity is used, and wasteful calculation is performed.

SECOND EMBODIMENT

The second embodiment of the present invention will be described next in detail. An example in which the electrical characteristics of a silicon substrate having an oxide film on the surface is simulated will be described below. For example, the MOS capacitor of a gate insulating film is simulated by calculating the potential value and carrier concentration at each lattice point of a mesh.

Figure 6:
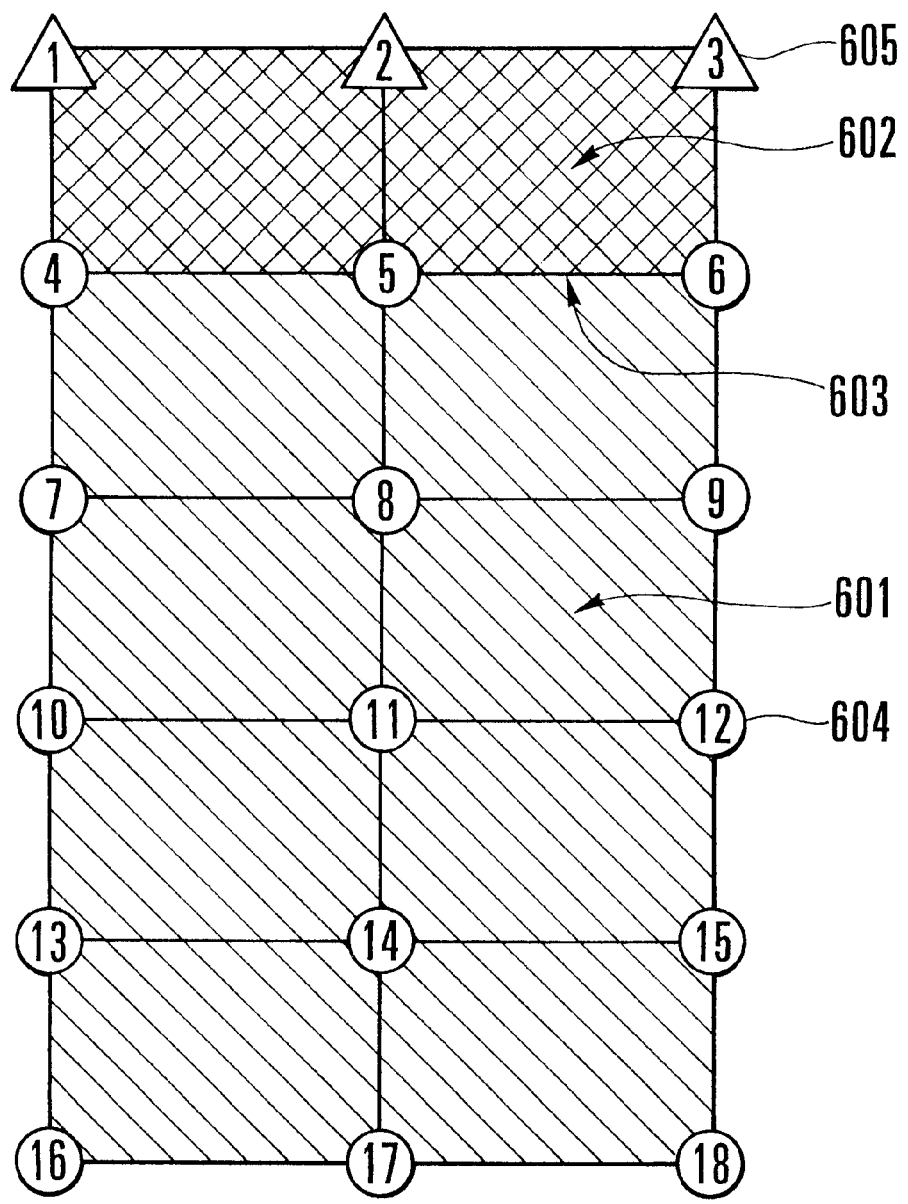
FIG. 6 is an explanatory view schematically showing the section of an object to be simulated in the second embodiment of the present invention.

In this device simulation as well, a mesh having a predetermined pitch is assigned to a section (two-dimensional region) of the silicon substrate having the oxide film, and predetermined equations are set for each mesh point. FIG. 6 shows the two-dimensional region. A region 601 divided into eight blocks is the region of the silicon substrate. A region 602 divided into two blocks on the region 601 indicates the oxide film formed on the silicon substrate. A line segment 603 represents the boundary between the silicon substrate and the oxide film.

Mesh points 604 having numbers "4" to "18" and marked with circles in the region 601 are mesh points assigned in the two-dimensional region of the silicon substrate. Mesh points 605 having numbers "1" to "3" and marked with triangles in the region 602 are mesh points assigned on the surface of the two-dimensional oxide film region. Unlike the above-described impurity diffusion process simulation, only one mesh point having the nature on the silicon substrate side is assigned at the interface between the silicon substrate and the oxide film.

At each mesh point, equation (17) as a Poisson equation holds:

$$\nabla(\in\nabla\phi)=-q(N_D-N_A-n+p) \tag{17}$$

where $\in$ is the dielectric constant of a substance, $\phi$ is the electrostatic potential, q is the unit charge, $N_D$ is the donor density, $N_A$ is the acceptor density, n is the electron density, and p is the hole density.

At a mesh point such as the mesh point 604 on the silicon substrate side, equations (18) and (19) as current continuous equations hold:

$$\frac{\partial n}{\partial t} = \nabla(D_n\nabla n - \mu_n\nabla\phi) + G - R \tag{18}$$

$$\frac{\partial p}{\partial t} = \nabla(D_p\nabla p - \mu_p\nabla\phi) + G - R \tag{19}$$

where $D_n$ is the diffusion constant of electrons, $D_p$ is the dispersion constant of holes, $\mu_n$ is the drift mobility of electrons, $\mu_p$ is the drift mobility of holes, G is the generation rate of electrons, and R is the recombination rate of electrons and holes.

In the impurity diffusion simulation of the first embodiment, different equations are defined for the oxide film region and the silicon region in diffusion of boron. In this device simulation, however, the definition regions of the Poisson equation and the current continuous equations are partially different.

The simulation operation of the second embodiment will be described below with reference to the flow chart shown in FIG. 2.

Figure 7:
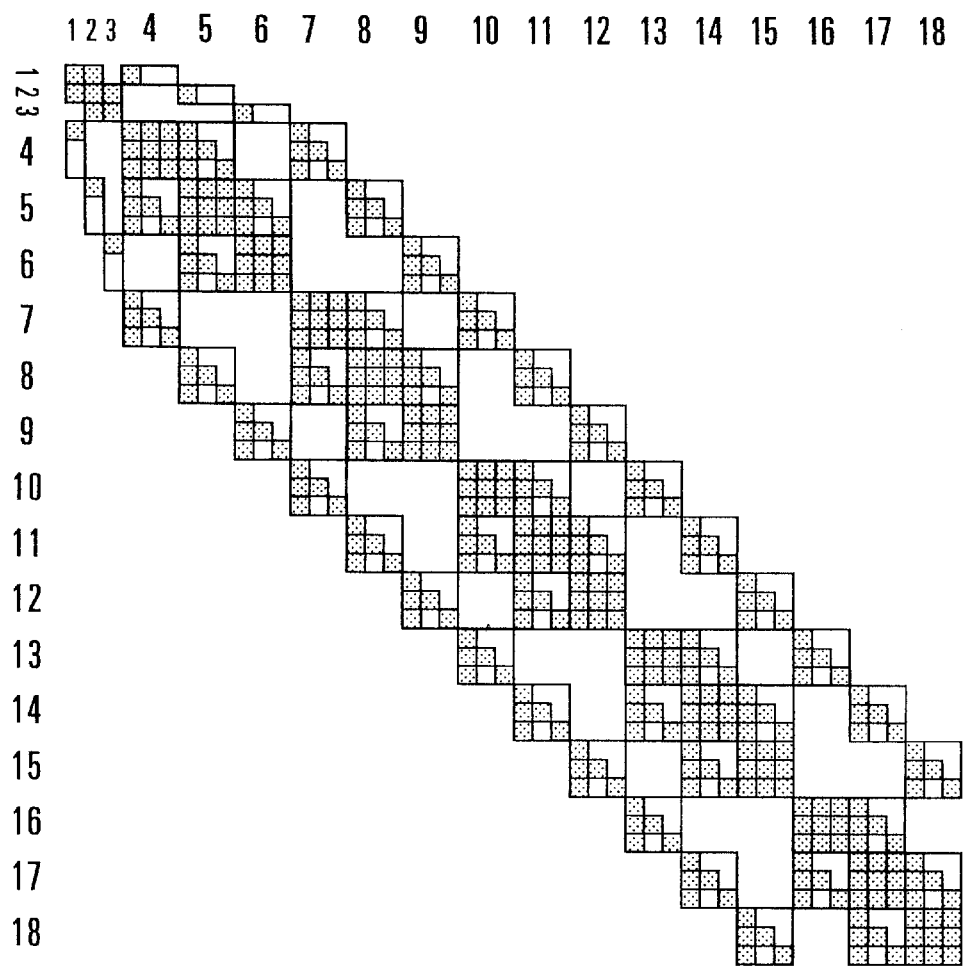
FIG. 7 is an explanatory view showing a coefficient matrix used to simulate the object to be simulated, shown in FIG. 6.
Figure 8:
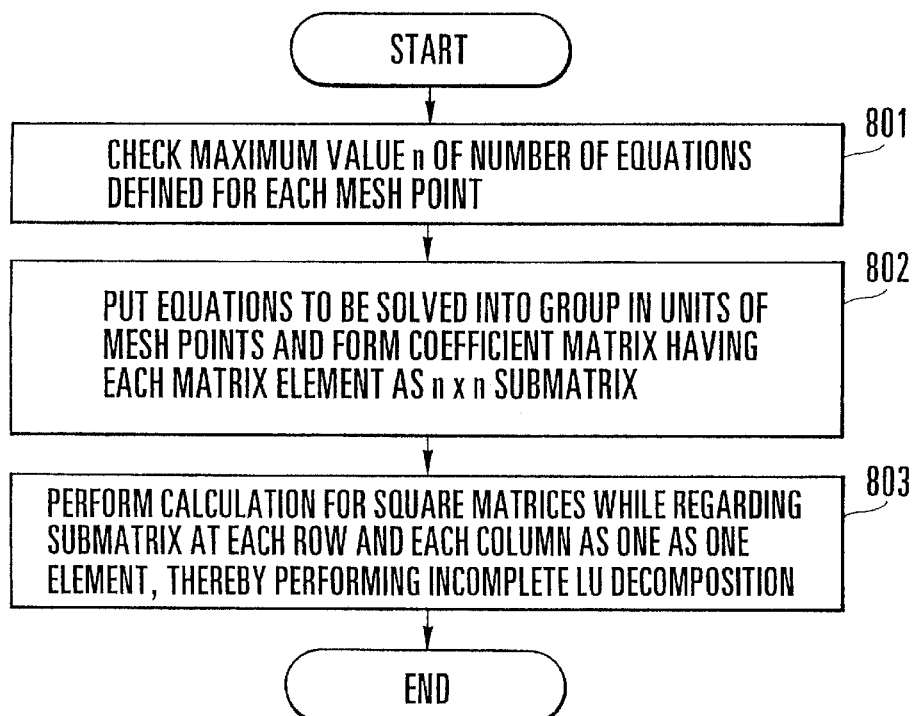
FIG. 8 is a flow chart showing the flow of basic operation of conventional semiconductor process device simulation.
Figure 9:
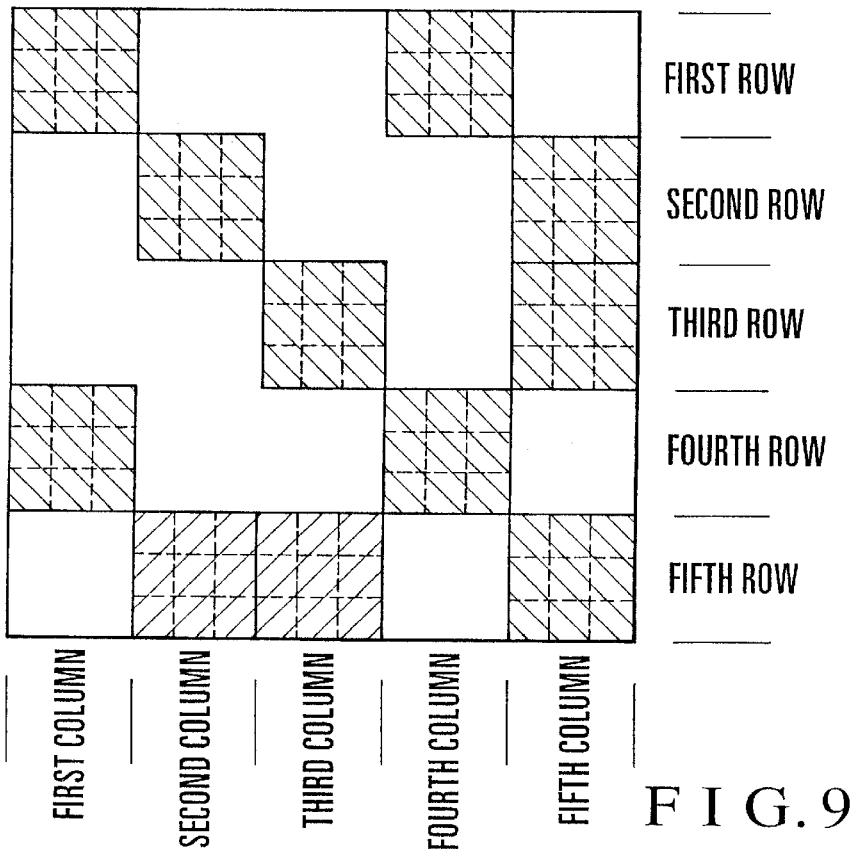
FIG. 9 is an explanatory view showing an example of the structure of a coefficient matrix formed in a conventional simulation operation.

First, the number of equations defined at each mesh point is checked (step 204). In the second embodiment; three equations, e.g., the above-described equations (17), (18), and (19) are defined at each of the mesh points 604 on the silicon substrate side in FIG. 6. In addition, the above-described equation (17) is defined at each of the mesh points 605 on the surface of the oxide film region. Subsequently, the equations to be solved are put into a group in units of mesh points to form a coefficient matrix represented by blocks shown in FIG. 7 (step 205). In FIG. 7, a coefficient matrix having 18 rows and 18 columns in correspondence with numbers "1" to "18" assigned to the mesh points shown in FIG. 6 is obtained. In one row of the coefficient matrix shown in FIG. 7, all of the square submatrix blocks at the mesh points constituting the principal diagonals having the row numbers as the mesh point numbers shown in FIG. 6 and the square or non-square submatrix blocks at adjacent mesh points connected to the mesh point are arranged.

In the second embodiment, for the mesh point 604, the width of each block is 3, as indicated by row "4" and column "4" to row "18" and column "18". To the contrary, for the mesh points 605 with numbers "1" to "3", the width of each block is 1, as indicated by row "1" and column "1" to row "3" and column "3". In each block shown in FIG. 7, a blank portion represents that a numerical value to be calculated is not stored.

For example, for row "5" in FIG. 7, which corresponds to the mesh point 604 represented by "5" in FIG. 6, a principal diagonal block of a 3×3 submatrix of the mesh point 604 with "5" is present at row "5" and column "5". This principal diagonal block has 9 numerical values to be calculated. As shown in FIG. 6, the mesh point 604 represented by "8" is present under the mesh point 604 represented by "5", so a 3×3 submatrix block corresponding to the mesh point 604 represented by "8" is present at row "5" and column "8" in FIG. 7. This submatrix block has five numerical values to be calculated. The mesh point 604 represented by "4" and the mesh point 604 represented by "6" are present on the left and right sides of the mesh point 604 represented by "5", respectively, so 3×3 submatrix blocks corresponding to these mesh points are present at row "5" and column "4" and row "5" and column "6". Each of these submatrix blocks also has five numerical values to be calculated. The mesh point 605 represented by "2" is present above the mesh point 604 represented by "5", so a 3×1 non-square submatrix block corresponding to the mesh point 605 is present at row "5" and column "2" shown in FIG. 7.

Similarly, for row "2" corresponding to the mesh point 605 represented by "2" in FIG. 6, a principal diagonal block of a 1×1 submatrix corresponding to the mesh point 605 is present at row "2" and column "2". Since the mesh points 605 represented by "1" and "3" are present on the left and right sides of the mesh point 605 represented by "2", 1×1 submatrix blocks are present at row "2" and column "1" and row "2" and column "3" in FIG. 7. In addition, since the mesh point 604 represented by "5" is present under the mesh point 605 represented by "2", a 1×3 non-square submatrix block is present at row "2" and column "5" in FIG. 7.

Finally, each submatrix is regarded as one element, and calculation for square matrices and calculation for non-square matrices are performed to perform incomplete LU-factorization in accordance with equations (1) and (2), thereby solving the equations and simulating the states at the above-described mesh points (step 206).

Conventionally, since a 3×3 submatrix is formed for all mesh points, an excess memory capacity is used, and wasteful calculation is performed. In the second embodiment, however, calculation is performed using matrices whose calculation amount is partially smaller than that of 3×3 submatrices, so wasteful calculation is omitted, and the calculation time can be shortened.

The present invention has been described with reference to the preferred embodiments, but is not limited to them.

According to the present invention, there is provided the semiconductor process device simulation method comprising a first step of dividing the surface of a semiconductor device to be processed into a mesh of predetermined size, a second step of assigning a numerical value to each mesh point of the mesh, a third step of setting equations representing a relationship among the plurality of numerical values, a fourth step of generating a coefficient matrix constituted by a principal diagonal submatrix arranged at any one of principal diagonals corresponding to each mesh point and representing a self feedback function at the mesh point, the principal diagonal submatrix having rows and columns in numbers corresponding to the number of mesh points, and a non-principal diagonal submatrix arranged on any one of a row and column passing through principal diagonal positions corresponding to the mesh point and representing an interaction between the mesh point corresponding to the principal diagonal positions and an adjacent mesh point connected to the mesh point through a mesh branch, and a fifth step of performing calculation for the submatrices while regarding each submatrix of the coefficient matrix as one element, thereby performing incomplete LU-factorization of the coefficient matrix, wherein the principal diagonal submatrix is a square matrix having rows and columns equal in number to equations set for a mesh point corresponding to the principal diagonal submatrix, the non-principal diagonal submatrix being arranged in a row direction in correspondence with each of the mesh points is a matrix having rows equal in number to equations set at a mesh point corresponding to the principal diagonal submatrix and columns equal in number to equations set at an adjacent mesh point connected to the mesh point through a mesh branch, and the non-principal diagonal submatrix being arranged in a column direction in correspondence with each of the mesh points is a matrix having columns equal in number to equations set at a mesh point corresponding to the principal diagonal submatrix and rows equal in number to equations set at an adjacent mesh point connected to the mesh point through a mesh branch.

With this arrangement, the non-principal diagonal submatrix is not always a square submatrix. When the number of equations set at an adjacent mesh point connected to a mesh point of interest through the mesh branch is smaller than that at the mesh point of interest, a non-square matrix is obtained, so the number of times of calculation becomes smaller than that when a square matrix is simply assigned. Therefore, in the present invention, less memory is required for calculation, and the simulation result can be obtained at a high speed.

What is claimed is:

1. A process for simulating the manufacture of semiconductor devices and for providing simulations of electrical characteristics of such simulated semiconductor devices by performing a plurality of matrix manipulations of terms representing physical properties of the simulated semiconductor devices, the matrices to be manipulated representing simultaneous linear equations that are to be solved by a matrix solver that uses an iterative method in which the matrices are preconditioned by incomplete LU-factorization, the method for generating fill-ins for the matrices comprising the steps of:

a first step of dividing a simulated surface of a semiconductor model into a plurality of rectangles forming a mesh of predetermined size;

a second step of assigning a numerical value to each mesh point of the mesh;

a third step of setting equations representing a relationship among the plurality of numerical values;

a fourth step of generating a coefficient matrix constituted by a plurality of principal diagonal submatrices each of which is arranged at each one of principal diagonal positions corresponding to each mesh point and representing a self feedback function to the mesh point, the coefficient matrix having rows and columns in numbers corresponding to the number of mesh points, and a plurality of non-principal diagonal submatrices each of which is arranged on any one of rows and columns passing through the principal diagonal positions corresponding to the mesh point and representing an interaction between the mesh point corresponding to the principal diagonal located on the same row or on the same column of the coefficient matrix with the non-principal diagonal submatrix and an adjacent mesh point connected to the mesh point through a mesh branch;

a fifth step of performing calculation for the submatrices while regarding each submatrix of the coefficient matrix as one element, thereby performing incomplete LU-factorization of the coefficient matrix, wherein each of the principal diagonal submatrices is a square having rows and columns equal in number to equations set for a mesh point corresponding to the principal diagonal submatrix, each of the non-principal diagonal submatrices arranged in a row direction in correspondence with each of the mesh points is a matrix having rows equal in number to equations set at a mesh point corresponding to the principal diagonal submatrix located in the row and columns equal in number to equations set at an adjacent mesh point connected to the mesh point through a mesh branch, and each of the non-principal diagonal submatrices arranged in a column direction in correspondence with each of the mesh points is a matrix having columns equal in number to equations set at a mesh point corresponding to the principal diagonal submatrix located in the column and rows equal in number to the equations set at an adjacent mesh point connected to the mesh point through a mesh branch; and a sixth step of outputting a signal representing electrical characteristics of the simulated device.

2. A computer readable memory storing a semiconductor device manufacturing process simulation program for simulating the manufacture of semiconductor devices and for providing simulations of electrical characteristics of such simulated semiconductor devices by performing a plurality of matrix manipulations of terms representing physical properties of the simulated semiconductor devices, the matrices to be manipulated representing simultaneous linear equations that are to be solved by a matrix solver that uses an iterative method in which the matrices are preconditioned by incomplete LU-factorization, the program including a routine for generating fill-ins for the matrices, the routine comprising the steps of:

causing a computer to perform the following functions:

a first function of dividing a simulated surface of a semiconductor model into a mesh of predetermined size;

a second function of assigning a numerical value to each mesh point of the mesh;

a third function of setting equations representing a relationship among the plurality of numerical values;

a fourth function of generating a coefficient matrix constituted by a plurality of principal diagonal submatrices each of which is arranged at each one of principal diagonal positions corresponding to each mesh point and representing a self feedback function at the mesh point, the coefficient matrix having rows and columns in numbers corresponding to the number of mesh points, and a plurality of non-principal diagonal submatrices each of which is arranged on any one of rows and columns and representing an interaction between the mesh point corresponding to the principal diagonal positions located on the same row or on the same column of the coefficient matrix with the non-principal diagonal submatrix and an adjacent mesh point connected to the mesh point through a mesh branch;

a fifth function of performing calculation for the submatrices while regarding each submatrix of the coefficient matrix as one element; thereby performing incomplete LU-factorization of the coefficient matrix, to produce a plurality of fill-ins for the matrices, wherein each of the principal diagonal submatrices is a square matrix having rows and columns equal in number to equations set forth for a mesh point corresponding to the principal diagonal submatrix, each of the non-principal diagonal submatrices arranged in a row direction in correspondence with each of the mesh points is a matrix having rows equal in number to equations set at a mesh point corresponding to the principal diagonal submatrix and located in the row and columns equal in number to equations set at an adjacent mesh point connected to the mesh point through a mesh branch, and each of the non-principal diagonal submatrices arranged in a column direction in correspondence with each of the mesh points is a matrix having columns equal in number to equations set a mesh point corresponding to the principal diagonal submatrix located in the column and rows equal in number to equations set at an adjacent mesh point connected to the mesh point through a mesh branch; and a sixth function of outputting a signal representing electrical characteristics of the simulated device.

* * * * *